(12) United States Patent
Covnot et al.

(10) Patent No.: US 12,705,254 B2
(45) Date of Patent: Aug. 11, 2026

(54) SYSTEMS AND METHODS FOR SHARD-BASED DATA INDEXING AND RETRIEVAL IN MULTI-KEY ENVIRONMENTS

(71) Applicant: BANK OF AMERICA CORPORATION, Charlotte, NC (US)

(72) Inventors: Burton M. Covnot, Carol Stream, IL (US); Troy LaPorte, Saint Charles, IL (US); Matthias Von Rueden, Northbrook, IL (US); Bryan J. Smith, Knoxville, TN (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 19/044,194

(22) Filed: Feb. 3, 2025

(65) Prior Publication Data

US 2026/0228238 A1 Aug. 6, 2026

(51) Int. Cl.
*G06F 16/27* (2019.01)
*G06F 16/22* (2019.01)
*G06F 16/23* (2019.01)

(52) U.S. Cl.
CPC ........ *G06F 16/278* (2019.01); *G06F 16/2255* (2019.01); *G06F 16/2282* (2019.01); *G06F 16/2365* (2019.01)

(58) Field of Classification Search
CPC .. G06F 16/2282; G06F 16/2255; G06F 16/23; G06F 16/2365; G06F 16/25; G06F 16/278
See application file for complete search history.

(56) References Cited

U.S. PATENT DOCUMENTS 10,893,067 B1 * 1/2021 Geil .................. G06F 16/24532
12,105,692 B1 * 10/2024 Kumar .................. G06F 16/278
2016/0055248 A1 * 2/2016 Goel ..................... G06F 16/134 707/770
2023/0009909 A1 * 1/2023 Porter ................... G06F 16/285
2024/0273077 A1 * 8/2024 Zeng ................... G06F 16/2282
2024/0289383 A1 * 8/2024 Sukhwani ........... G06F 16/9014

FOREIGN PATENT DOCUMENTS

CN 116910053 A * 10/2023 ......... G06F 16/2255

* cited by examiner

*Primary Examiner* — James E Richardson
(74) *Attorney, Agent, or Firm* — Moore & Van Allen PLLC; Nicholas C. Russell

(57) ABSTRACT

Systems, computer program products, and methods are described herein for shard-based data indexing and retrieval in multi-key environments. The present disclosure is configured to streamline data management by utilizing a shard directory to assign unique shard key hashes to database records. This configuration allows for the efficient creation, addition, updating, and deletion of keys with minimal computational overhead. By leveraging a domain, key type, and key value, the system computes a compact shard key hash, facilitating targeted data retrieval within a specific shard. This eliminates the need to search across all shards, thereby enhancing performance. The system's instructions, when executed by a processing device, ensure that these operations preserve data integrity and optimize database interactions, leading to a more responsive and scalable data infrastructure.

20 Claims, 5 Drawing Sheets

SHARD KEY DIRECTORY
202

| DOMAIN | KEY TYPE | KEY VALUE | SHARD KEY | TIMESTAMP |
|---|---|---|---|---|
| DOMAIN 1 | AAA | ACCTKEY1 | 11234 | TS1 |
| DOMAIN 1 | BBB | ACCTKEY2 | 11234 | TS2 |
| DOMAIN 2 | CCC | ACCTKEY3 | 33456 | TS3 |
| DOMAIN 3 | DDD | CUSTID1 | 11234 | TS4 |
| DOMAIN 4 | EEE | CUSTID2 | 57890 | TS5 |

SHARD KEY LOOKUP VALUES
204

COMPUTED "MINI-HASH"
206

DATE/TIME OF ENTRY CREATION
208

SHARD KEY DIRECTORY
202

| DOMAIN | KEY TYPE | KEY VALUE | SHARD KEY | TIMESTAMP |
|---|---|---|---|---|
| DOMAIN 1 | AAA | ACCTKEY1 | 11234 | TS1 |
| DOMAIN 1 | BBB | ACCTKEY2 | 11234 | TS2 |
| DOMAIN 2 | CCC | ACCTKEY3 | 33456 | TS3 |
| DOMAIN 3 | DDD | CUSTID1 | 11234 | TS4 |
| DOMAIN 4 | EEE | CUSTID2 | 57890 | TS5 |

SHARD KEY LOOKUP VALUES
204

COMPUTED “MINI-HASH”
206

DATE/TIME OF ENTRY CREATION
208

FIGURE 2

SYSTEMS AND METHODS FOR SHARD-BASED DATA INDEXING AND RETRIEVAL IN MULTI-KEY ENVIRONMENTS

CROSS-REFERENCE TO RELATED APPLICATIONS

This application is a non-provisional patent application of U.S. Provisional Patent Application No. 63/549,875, filed Feb. 5, 2024, titled “Systems and Methods for Shard-Based Data Indexing and Retrieval in Multi-Key Environments.” The entirety of which is hereby incorporated by reference herein.

TECHNOLOGICAL FIELD

Example embodiments of the present disclosure pertain to data management systems, more specifically to systems and methods for efficient data indexing and retrieval in multi-key environments using a shard-based approach.

BACKGROUND

In large-scale data management systems, particularly those handling billions of documents, the challenge of efficiently indexing and retrieving data becomes significant when documents are associated with multiple keys. Traditional sharding techniques, such as standard hash-based or range-based sharding, are not optimized for such multi-key scenarios, leading to reduced performance due to the necessity of searching across multiple shards.

Applicant has identified a number of deficiencies and problems associated with shard-based data indexing and retrieval in multi-key environments. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for shard-based data indexing and retrieval in multi-key environments. The present invention introduces an innovative system and method for managing shard keys in a way that optimizes data indexing and retrieval in multi-key environments. By assigning unique, high cardinality hash keys to document indexing/search keys external to the database, the invention facilitates efficient mapping and searching of documents within single shards, even when those documents are associated with multiple keys.

The invention describes a system, method, and computer program product for shard-based data indexing and retrieval in multi-key environments, the invention comprising: receiving input data for the creation or addition of a key to a database record; computing a shard key hash based on the input data; accessing a shard directory within a sharded database environment to determine if the computed shard key hash exists within the shard directory; performing a search operation by receiving a search query, locating a shard key hash in the shard directory corresponding to the search query, and executing a targeted search in the sharded database environment using the located shard key hash when the search query is associated with a single key; updating a database record by receiving updated data, locating an existing shard key hash from the shard directory; modifying the database record and the shard directory entry to reflect the updated data; deleting a database record by identifying the database record to be deleted, locating an associated shard key hash in the shard directory, and removing the database record and the corresponding shard directory entry; and maintaining each shard key hash as immutable with a single database record or a set of records sharing a domain and key type.

In some embodiments, the shard key hash is a unique identifier derived from an integer hash of a combination of a domain, a key type, and a key value associated with the input data. In some embodiments, the shard key hash is reduced to a predetermined number of digits to facilitate shard mapping.

In some embodiments, in response to the shard key hash not existing within the shard directory, create a new shard key hash entry in the shard directory and associating the new shard key hash with the input data.

In some embodiments, upon the shard key hash existing within the shard directory or after creating a new shard key hash entry, creating or updating a database record with the shard key hash to enable indexed storage of the database record within a corresponding shard of a sharded database environment.

In some embodiments, the invention further comprises reindexing the database record by receiving updated data, locating an existing shard key hash from the shard directory, and modifying the database record and the shard directory entry to reflect the reindexing.

In some embodiments, maintaining each shard key hash as immutable further comprises maintaining the sharded database environment integrity by ensuring that each shard key hash is immutable once set and is uniquely associated with a single database record or a set of records sharing the same domain and key type.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
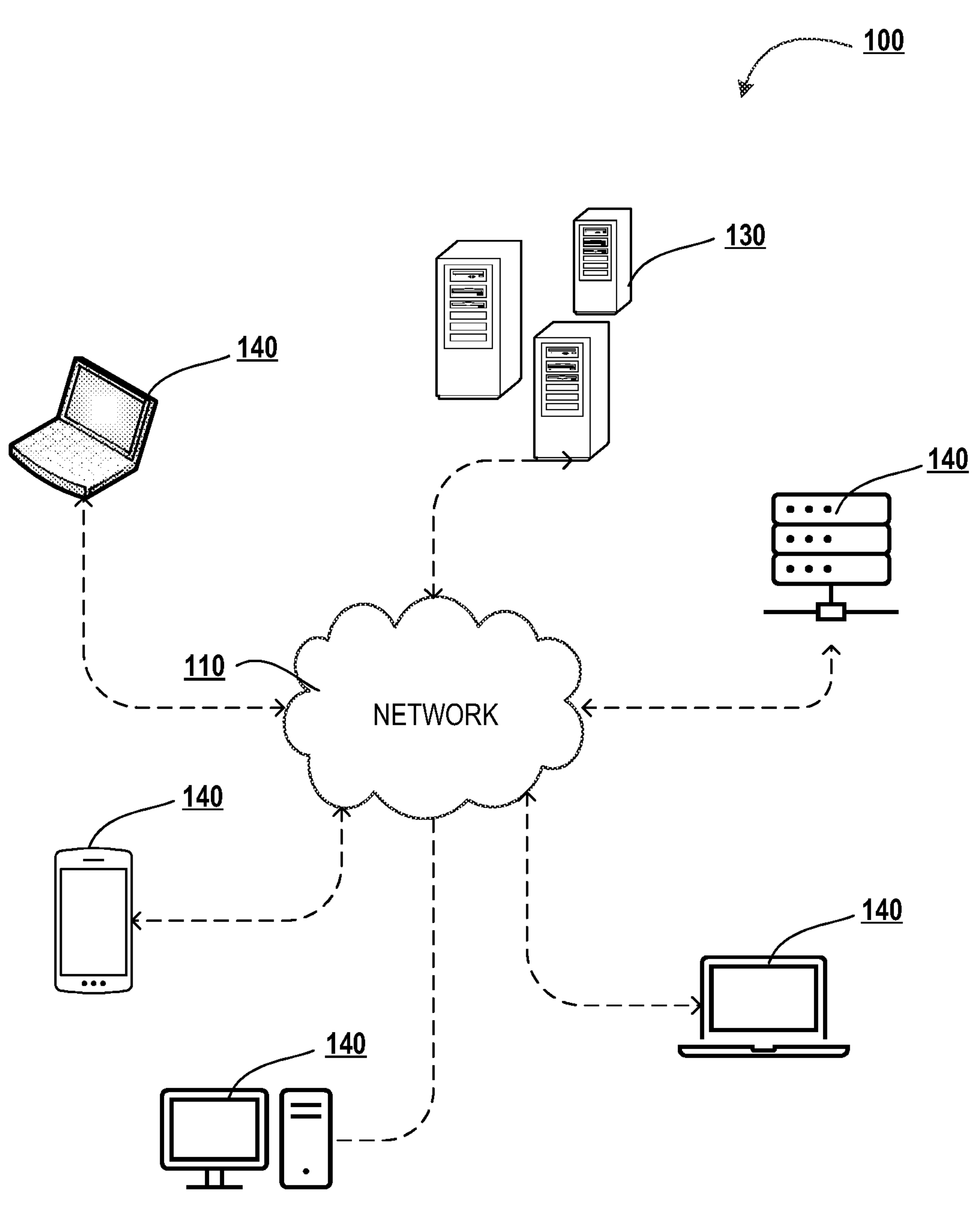
Figure 1B:
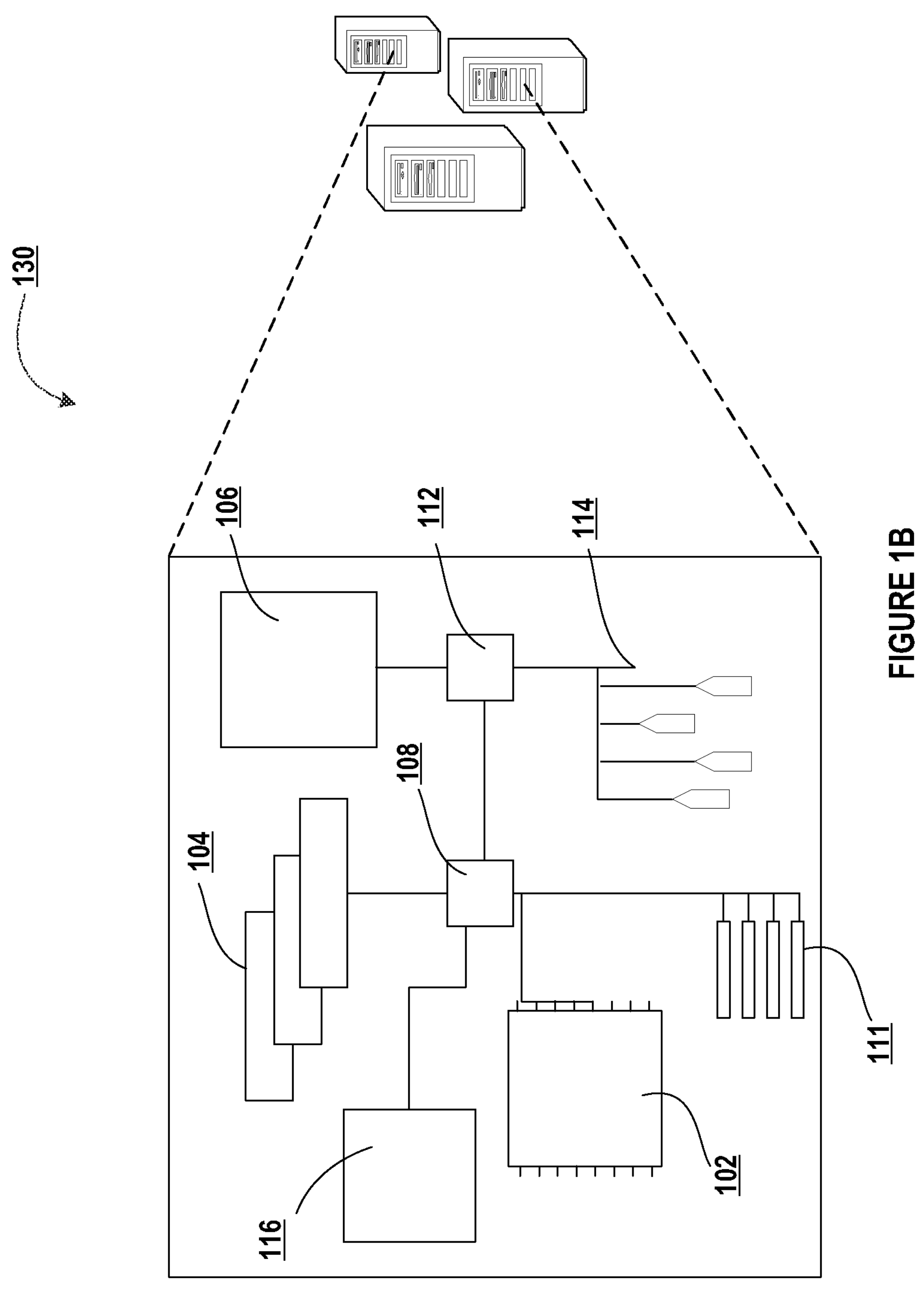
Figure 1C:
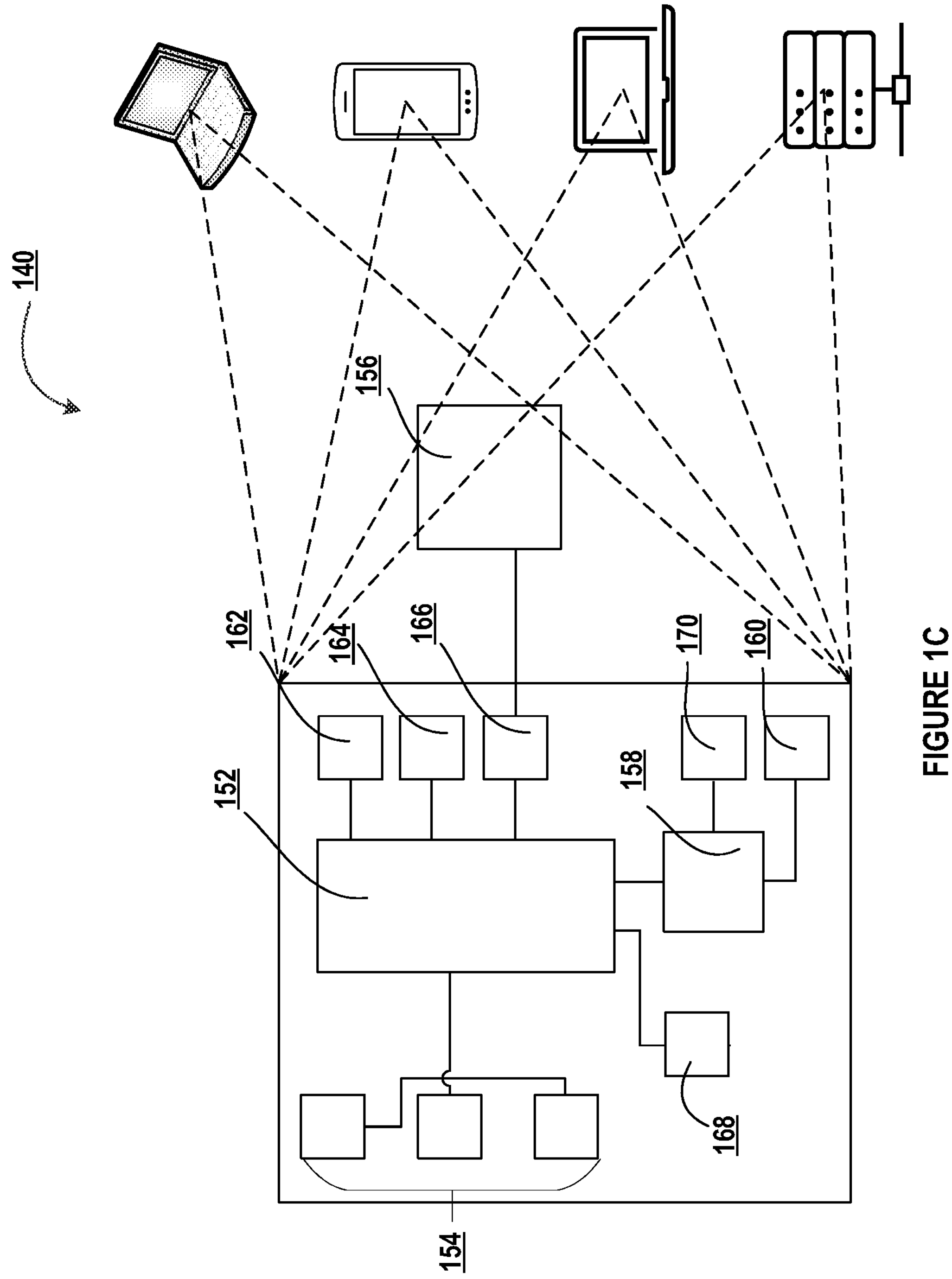
Figure 3:
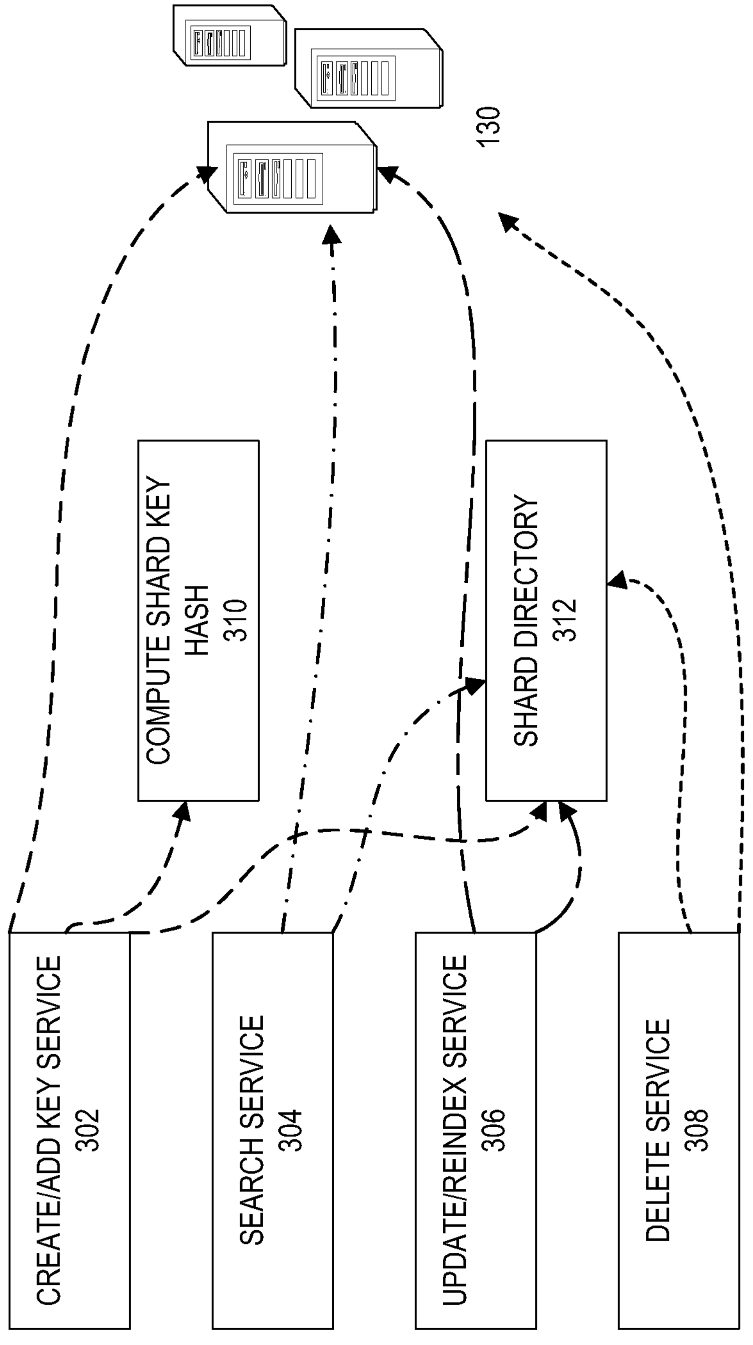

FIGS. 1A-1C illustrates technical components of an exemplary distributed computing environment for shard-based data indexing and retrieval in multi-key environments, in accordance with an embodiment of the disclosure;

FIG. 2 illustrates a shard key directory 202 for shard-based data indexing and retrieval in multi-key environments, in accordance with an embodiment of the disclosure; and FIG. 3 illustrates a process flow diagram for shard-based data indexing and retrieval in multi-key environments, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "sharding," "data sharding," or "database sharding" may refer to a method of database architecture where a larger database is partitioned into smaller, faster, more easily managed parts called shards. The essence of sharding is the horizontal partitioning of data across independent databases, each shard being held on a separate database server instance to spread load. While not limited to, sharding may involve a variety of partitioning strategies such as, but not limited to, range-based sharding, hash-based sharding, or directory-based sharding. Each shard may operate either as a standalone database or as a part of a composite database system. A "shard" or "data shard" may refer to any discrete subset of a dataset or database that is designed for optimal data retrieval and storage efficiency. Sharding can be dynamic, allowing for shards to be created, removed, or modified as the system scales. Unless the context indicates otherwise, sharding may encompass the distribution of data across different geographical locations, systems, or storage types. In certain embodiments, sharding is employed to improve database performance, enhance maintenance capabilities, optimize query response times, and facilitate high availability and disaster recovery scenarios. Sharding may also refer to the process of distributing a single logical dataset across a cluster of machines, enabling a database to scale to sizes and performance levels that a single machine could not achieve alone.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The technology presented in this disclosure pertains to a sophisticated data management system designed for large-scale datastores. It primarily focuses on enhancing data retrieval efficiency in environments where documents are associated with multiple keys, which is a common scenario in today's data-intensive industries. The primary problem in the field of large-scale data management is the inefficiency in indexing and retrieving documents when they are associated with multiple keys. In massive datastores, this leads to a performance bottleneck, as traditional shard-based search strategies necessitate searching across multiple shards, which is both time-consuming and resource-intensive.

The solution is akin to creating a highly efficient filing system that can quickly locate a specific file even if it's labeled with multiple tags. This is achieved by a novel method of organizing and retrieving data, where each document is assigned a unique identifier that simplifies its location, irrespective of how many different keys are associated with it. This method ensures that searches are fast and targeted, directly leading to the required data shard without the need to search through unrelated data. Accordingly, the present disclosure introduces a revolutionary approach to data indexing and retrieval in multi-key environments. This is achieved through a unique shard key management system that significantly reduces the complexity and inefficiency of traditional methods. The system assigns a unique, high cardinality hash key to each document, enabling swift and precise data retrieval. This solution not only enhances the performance of large-scale datastores but also simplifies the data management process, making it more accessible and effective for various industries.

What is more, the present disclosure provides a technical solution to a technical problem. As described herein, the technical problem includes the challenge of efficiently managing and retrieving data in large-scale datastores with documents associated with multiple keys. The technical solution presented herein allows for targeted and efficient data retrieval by mapping documents to specific shards using a unique shard key management system. In particular, this solution is an improvement over existing solutions to the problem of multi-key data retrieval in massive datastores by (i) reducing the steps required for data retrieval, thus minimizing the use of computing resources such as processing power, storage, and network bandwidth, (ii) enhancing the accuracy of the retrieval process, thereby reducing the resources spent on correcting errors from less accurate solutions, (iii) eliminating manual processes and inefficiencies in data management, leading to faster and more efficient operations, and (iv) optimizing the use of resources required for implementing the solution, thereby reducing network congestion and the load on computing systems. Furthermore, the technical solution described herein employs a sophisticated, computerized process to execute tasks that were previously not performed or were performed less efficiently. In specific implementations, this solution bypasses certain steps that were traditionally necessary, further conserving computing resources and enhancing overall system performance.

FIGS. 1A-1C illustrate technical components of an exemplary distributed computing environment 100 for shard-based data indexing and retrieval in multi-key environments, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a shard key directory 202 for shard-based data indexing and retrieval in multi-key environments, in accordance with an embodiment of the disclosure. It is understood that best practice for database sharding involves splitting a database into multiple shards, which are essentially horizontal partitions of data across separate database server instances. This technique is designed to distribute the load and optimize the performance of data retrieval processes. The use of natural keys, such as resource account numbers, may be a preferred embodiment in the indexing and retrieval of database items, as it allows for a direct and intuitive mapping of data to its storage location.

It is understood that a directory may define the sharding strategy by using a range of account numbers to allocate data to the appropriate shard. For instance, the key value range may be broadly set from 0000 0000 0000 to 9999 9999 9999 and then divided among the shards in a manner that allows for an equitable and organized distribution of data. This structured approach not only enhances the efficiency of data storage but also streamlines the retrieval process, ensuring that data can be located and accessed with minimal latency.

A detailed shard key lookup table within the directory is instrumental in facilitating this process. It lists specific ranges of resource account numbers and associates them with corresponding shard numbers. For example, in some embodiments, account numbers beginning with digits in the range of 0000 0000 0000 to 4000 0000 0000 are mapped to Shard 1, those from 4000 0000 0001 to 7000 0000 0000 to Shard 2, and from 7000 0000 0001 to 9999 9999 9999 to Shard 3. This explicit mapping ensures that queries can be efficiently routed to the correct shard, thereby reducing unnecessary search operations across the entire database.

The operational efficacy of this sharding strategy may be further highlighted by the role of a query controller. Upon receiving a search query, the controller may consult the shard key directory to determine the destination shard. For instance, a search query for account number 4147 2110 2998 can be swiftly routed to Shard 2 based on the shard key lookup table. This methodology significantly reduces the time and computational resources required for data retrieval. The present invention goes beyond the conventional sharding strategy by offering a unique solution for a directory-based shard key for multi-keyed records.

The diagram provided in FIG. 2 showcases a shard key directory 202, which is a crucial component of a shard-based data indexing and retrieval system in multi-key environments. The directory is laid out in a table format with several columns that include Domain, Key Type, Key Value, Shard Key, and Timestamp. The Domain column represents the business domain of the primary key, indicating the specific area within the business to which the key is related, such as "Deposits" or "Mortgage," for example, though it is understood that any number of categories are contemplated within the umbrella of the present invention. The Key Type and Key Value columns together specify the primary key used for indexing the document upon ingestion into the system. This primary key is composed of a key type, like "SAV" for savings account or "MTG" for mortgage, or the like, and a key value, which is a unique identifier such as "ACCTKEY1," "CUSTID1," or the like. As shown in FIG. 2, shard key lookup values 204 may comprise domain, key type, or key value.

It is understood that a shard key hash, noted in the table as "Shard Key," is a computed value, generated by an integer hash of the concatenation of domain, key type, and key value. This hash is then reduced to a five-digit "mini-hash," which serves as a simplified yet unique identifier for sharding purposes. It is understood that various other embodiments may include a reduction of the computed mini-hash 206 using a different number of integer values, depending on the specific application of the present invention and goals of each embodiment. Each entry in the shard key directory has an associated timestamp, depicted as date/time of entry creation 208, indicating when the entry was created, which helps in maintaining the chronology and versioning of the records. In the operation of this system, a CDL (Create, Delete, Lookup) Create service plays a pivotal role. When a new record is to be added to the database, the service first checks for the existence of the shard key within the directory. If the shard key is already present, it is reused; if not, a new shard key is computed and a new directory entry is made. This ensures that each record has all the necessary shard key components in place, and once set, the shard key hash becomes an immutable part of the record.

It is understood that a CDL Search service is designed to facilitate efficient data retrieval. When a query includes a single domain and key, the service locates the shard key in the directory and utilizes it to conduct a targeted search within the database, thereby pinpointing a specific shard without the need to query the entire database. This targeted search is not possible when the query spans multiple lines of business (LOB) domains or involves multiple keys; in such cases, the search must encompass all shards.

For updates, a CDL Update service checks the directory when a new key is to be associated with an existing document. If the new key is not found within the directory for that domain, the shard key of the primary key is used to create a new directory entry for the new key. However, if the key already exists within the directory and is in the same domain as the primary key, its shard key is set to zero. This indicates that a targeted search is no longer feasible for this key since it may be present in multiple shards. It is understood that this system offers a robust solution for managing and retrieving data in complex, multi-key environments, addressing the challenges of scalability and performance in large-scale databases.

FIG. 3 illustrates a process flow diagram for shard-based data indexing and retrieval in multi-key environments, in accordance with an embodiment of the disclosure. As shown, FIG. 3 delineates a comprehensive architecture for managing a sharded database, detailing the interaction between various services and the shard directory 312 for optimal data handling and retrieval. At the outset, the create/add key service 302 functions as the initiation point for the insertion of new records or the addition of keys to the database. It engages with the compute shard key hash 310 process to generate a unique shard key if it is absent in the current directory. This key hash is essential for identifying the appropriate shard where the record will be stored, ensuring that each document's location within the database is both unique and efficiently accessible.

Subsequently, the search service 304 serves as the mechanism through which data is located within the database. It operates by consulting the shard directory 312 to ascertain the shard key associated with the requested data. When the search involves a single key, and the shard key is obtained, the search service executes a targeted query to the database, leveraging the shard key to pinpoint the data within the correct shard, thereby streamlining the search process. In parallel, the update/reindex service 306 is responsible for the maintenance and updating of existing records. It looks up the existing shard key in the shard directory 312 when changes are made to a document. If a new key is introduced, it is indexed and the shard directory is updated to reflect the addition. This ensures that all modifications are synchronized within the database, and the integrity of the sharding system is preserved.

Furthermore, the delete service 308 is in place to handle the removal of records from the database. It uses the shard key to locate the record within the shard directory and proceeds with its deletion. This service is vital for ensuring that data removal is handled carefully, without disrupting the overall structure and organization of the shards. Overall, the services outlined in FIG. 3, in conjunction with the shard directory 312, create a robust framework for managing data within a sharded database environment. This framework allows for efficient and precise data operations, from creation and addition of keys to searching, updating, reindexing, and deletion of records, thereby ensuring the database's performance remains optimal.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for shard-based data indexing and retrieval in multi-key environments, the system comprising:

at least one non-transitory storage device; and at least one processor coupled to the at least one non-transitory storage device, wherein the at least one processor is configured to:

receive input data for the creation or addition of a key to a database record;

compute a shard key hash based on the input data;

access a shard directory within a sharded database environment to determine if the computed shard key hash exists within the shard directory;

perform a search operation by receiving a search query comprising a single domain and a single key type, locating a shard key hash in the shard directory corresponding to the single domain and the single key type, and executing a targeted search in the sharded database environment using the located shard key hash when the search query is associated with a single key;

update the database record by receiving updated data, locating an existing shard key hash from the shard directory;

modify the database record and the shard directory entry to reflect the updated data;

delete the database record by identifying the database record to be deleted, locating an associated shard key hash in the shard directory, and removing the database record and the corresponding shard directory entry; and maintain each shard key hash as immutable with a single database record or a set of records sharing the single domain and the single key type.

2. The system of claim 1, wherein the shard key hash is a unique identifier derived from an integer hash of a combination of a domain, a key type, and a key value associated with the input data.

3. The system of claim 2, wherein the shard key hash is reduced to a predetermined number of digits to facilitate shard mapping.

4. The system of claim 1, wherein in response to the shard key hash not existing within the shard directory, create a new shard key hash entry in the shard directory and associating the new shard key hash with the input data.

5. The system of claim 1, wherein upon the shard key hash existing within the shard directory or after creating a new shard key hash entry, creating or updating the database record with the shard key hash to enable indexed storage of the database record within a corresponding shard of a sharded database environment.

6. The system of claim 1, further comprising reindexing the database record by receiving updated data, locating an existing shard key hash from the shard directory, and modifying the database record and the shard directory entry to reflect the reindexing.

7. The system of claim 1, wherein maintaining each shard key hash as immutable further comprises maintaining the sharded database environment integrity by ensuring that each shard key hash is immutable once set and is uniquely associated with the single database record or a set of records sharing the same domain and key type.

8. A computer program product for shard-based data indexing and retrieval in multi-key environments the computer program product comprising a non-transitory computer-readable medium comprising code causing an apparatus to:

receive input data for the creation or addition of a key to a database record;

compute a shard key hash based on the input data;

access a shard directory within a sharded database environment to determine if the computed shard key hash exists within the shard directory;

perform a search operation by receiving a search query comprising a single domain and a single key type, locating a shard key hash in the shard directory corresponding to the single domain and the single key type, and executing a targeted search in the sharded database environment using the located shard key hash when the search query is associated with a single key;

update the database record by receiving updated data, locating an existing shard key hash from the shard directory;

modify the database record and the shard directory entry to reflect the updated data;

delete the database record by identifying the database record to be deleted, locating an associated shard key hash in the shard directory, and removing the database record and the corresponding shard directory entry; and maintain each shard key hash as immutable with a single database record or a set of records sharing the single domain and the single key type.

9. The computer program product of claim 8, wherein the shard key hash is a unique identifier derived from an integer hash of a combination of a domain, a key type, and a key value associated with the input data.

10. The computer program product of claim 9, wherein the shard key hash is reduced to a predetermined number of digits to facilitate shard mapping.

11. The computer program product of claim 8, wherein in response to the shard key hash not existing within the shard directory, create a new shard key hash entry in the shard directory and associating the new shard key hash with the input data.

12. The computer program product of claim 8, wherein upon the shard key hash existing within the shard directory or after creating a new shard key hash entry, creating or updating the database record with the shard key hash to enable indexed storage of the database record within a corresponding shard of a sharded database environment.

13. The computer program product of claim 8, further comprising reindexing the database record by receiving updated data, locating an existing shard key hash from the shard directory, and modifying the database record and the shard directory entry to reflect the reindexing.

14. The computer program product of claim 8, wherein maintaining each shard key hash as immutable further comprises maintaining the sharded database environment integrity by ensuring that each shard key hash is immutable once set and is uniquely associated with the single database record or a set of records sharing the same domain and key type.

15. A method for shard-based data indexing and retrieval in multi-key environments the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving input data for the creation or addition of a key to a database record;

computing a shard key hash based on the input data;

accessing a shard directory within a sharded database environment to determine if the computed shard key hash exists within the shard directory;

performing a search operation by receiving a search query comprising a single domain and a single key type, locating a shard key hash in the shard directory corresponding to the single domain and the single key type, and executing a targeted search in the sharded database environment using the located shard key hash when the search query is associated with a single key;

updating the database record by receiving updated data, locating an existing shard key hash from the shard directory;

modifying the database record and the shard directory entry to reflect the updated data;

deleting the database record by identifying the database record to be deleted, locating an associated shard key hash in the shard directory, and removing the database record and the corresponding shard directory entry; and maintaining each shard key hash as immutable with a single database record or a set of records sharing the single domain and the single key type.

16. The method of claim 15, wherein the shard key hash is a unique identifier derived from an integer hash of a combination of a domain, a key type, and a key value associated with the input data.

17. The method of claim 16, wherein the shard key hash is reduced to a predetermined number of digits to facilitate shard mapping.

18. The method of claim 15, wherein in response to the shard key hash not existing within the shard directory, create a new shard key hash entry in the shard directory and associating the new shard key hash with the input data.

19. The method of claim 15, wherein upon the shard key hash existing within the shard directory or after creating a new shard key hash entry, creating or updating the database record with the shard key hash to enable indexed storage of the database record within a corresponding shard of a sharded database environment.

20. The method of claim 15, further comprising reindexing the database record by receiving updated data, locating an existing shard key hash from the shard directory, and modifying the database record and the shard directory entry to reflect the reindexing.

* * * * *